(12) United States Patent
Jang

(10) Patent No.: US 10,718,965 B2
(45) Date of Patent: Jul. 21, 2020

(54) LIQUID CRYSTAL DISPLAY DEVICE

(71) Applicant: LG Display Co., Ltd., Seoul (KR)

(72) Inventor: SangHo Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/815,179

(22) Filed: Nov. 16, 2017

(65) Prior Publication Data

US 2018/0143483 A1 May 24, 2018

(30) Foreign Application Priority Data

Nov. 23, 2016 (KR) .................. 10-2016-0156773

(51) Int. Cl.
| | | |
|---|---|---|
| G02F 1/1333 | (2006.01) | |
| G02F 1/1345 | (2006.01) | |
| F21V 8/00 | (2006.01) | |
| G02F 1/1335 | (2006.01) | |
| G02F 1/1362 | (2006.01) | |

(52) U.S. Cl.
CPC ..... *G02F 1/133308* (2013.01); *G02B 6/0018* (2013.01); *G02F 1/1345* (2013.01); *G02F 1/13458* (2013.01); *G02F 1/133345* (2013.01); *G02F 1/133509* (2013.01); *G02F 1/136227* (2013.01); *G02B 6/0051* (2013.01); *G02B 6/0088* (2013.01); *G02F 1/133504* (2013.01); *G02F 2001/133331* (2013.01)

(58) Field of Classification Search
CPC ........... G02F 1/13454; G02F 1/133308; G02F 1/133528; G02F 2201/56; G02B 5/30; G02B 27/28
See application file for complete search history.

(56) References Cited

U.S. PATENT DOCUMENTS

| | | | | |
|---|---|---|---|---|
| 2008/0225221 | A1* | 9/2008 | Abe | G02F 1/13452 349/153 |
| 2010/0315570 | A1* | 12/2010 | Mathew | G06F 1/1637 349/58 |
| 2013/0328051 | A1* | 12/2013 | Franklin | H01L 29/786 257/59 |
| 2014/0240650 | A1* | 8/2014 | Motooka | G02F 1/133512 349/110 |
| 2016/0161776 | A1* | 6/2016 | Wang | G02F 1/1339 349/43 |

* cited by examiner

*Primary Examiner* — Michael H Caley
*Assistant Examiner* — Mariam Qureshi
(74) *Attorney, Agent, or Firm* — Polsinelli PC

(57) ABSTRACT

Disclosed is a liquid crystal display (LCD) device for preventing a crack from occurring in a pad part of a thin film transistor (TFT) substrate. The LCD device includes a liquid crystal display panel including a TFT substrate and a color filter substrate on an upper surface of the TFT substrate, a guide panel supporting the liquid crystal display panel, and a driver integrated circuit (IC) in a lower non-display area of the upper surface of the TFT substrate. The color filter substrate extends to the lower non-display area of the upper surface of the TFT substrate.

20 Claims, 6 Drawing Sheets

Comparative Example

LIQUID CRYSTAL DISPLAY DEVICE

CROSS-REFERENCE TO RELATED APPLICATION

This application claims the benefit of the Korean Patent Application No. 10-2016-0156773 filed on Nov. 23, 2016, which is hereby incorporated by reference in its entirety as if fully set forth herein.

BACKGROUND

Field of the Disclosure

The present disclosure relates to a display device, and more particularly, to a liquid crystal display (LCD) device.

Description of the Background

Generally, since LCD devices are driven with a low operating voltage, they have low power consumption and are used as portable devices. Accordingly, the LCD devices are widely applied to various fields such as notebook computers, monitors, spacecraft, airplanes, etc.

In the LCD devices, a liquid crystal display panel which displays an image includes a thin film transistor (TFT) substrate, a color filter substrate, and a liquid crystal layer provided between the TFT substrate and the color filter substrate. An alignment of liquid crystals of the liquid crystal layer is controlled by applying an electric field, thereby adjusting a transmittance of light.

The LCD devices have a mode where a pixel electrode is provided on the TFT substrate, a common electrode is provided on the color filter substrate, and the alignment of the liquid crystals of the liquid crystal layer is controlled with a vertical electric field generated between the pixel electrode and the common electrode. Also, the LCD devices have another mode where the pixel electrode and the common electrode are provided on the TFT substrate, and the alignment of the liquid crystals of the liquid crystal layer is controlled with a lateral electric field generated between the pixel electrode and the common electrode.

In LCD devices for controlling the alignment of the liquid crystals of the liquid crystal layer with the lateral electric field, a TFT, the pixel electrode, and the common electrode are provided on the TFT substrate, and a light blocking layer and a color filter (CF) are provided on the color filter substrate. The liquid crystal display panel is completed by forming the liquid crystal layer between the TFT substrate and the opposite substrate.

After the liquid crystal display panel is completed, a backlight unit which acts as a light source of an LCD device is provided. In order to keep a thickness of the LCD device, an edge type backlight unit can be used where the backlight unit is disposed on a side surface of the liquid crystal display panel. In the edge type backlight unit, a light guide plate (LGP) for causing light emitted from the backlight unit to travel to a liquid crystal cell is provided under the liquid crystal display panel.

Subsequently, the backlight unit is manufactured as a finished product through a module process. In the module process, a guide panel for supporting the backlight unit is coupled to a side surface of the backlight unit. Then, a reflective sheet for reflecting light, traveling to a portion under the light guide plate, to an upper portion is provided, and a driver integrated circuit (IC) for driving the liquid crystal display panel is mounted on the TFT substrate instead of the color filter substrate.

The driver IC is disposed in only a partial area, instead of the whole area, of the TFT substrate extending to the non-display area. Therefore, a step height caused by the color filter substrate and an upper polarizer occurs in an area where the driver IC is not disposed. Due to the step height, when a physical force is applied from the outside, a crack can occur in a pad part corresponding to a region, where the driver IC is provided, of the non-display area of the liquid crystal display panel.

In the related art LCD device, in order to prevent a crack from occurring in the pad part, a gap filling tape is disposed in an area where the driver IC is not disposed.

However, a crack defect continuously occurs in the pad part of the TFT substrate as a result of a drop test. Since coupled portions of a panel have a gap therebetween instead of being provided as one body, troublesome reduction in stiffness causes a crack. For this reason, a crack continuously occurs on the corners of the pad part of the TFT substrate, causing the continuous issues to consumers.

SUMMARY

Accordingly, the present disclosure is directed to provide a liquid crystal display (LCD) device that substantially obviates one or more problems due to limitations and disadvantages of the related art.

An aspect of the present disclosure is directed to provide an LCD device for preventing a crack from occurring in a pad part of a TFT substrate.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a liquid crystal display (LCD) device including a liquid crystal display panel including a thin film transistor (TFT) and a color filter substrate on an upper surface of the TFT substrate, a guide panel supporting the liquid crystal display panel, and a driver integrated circuit (IC) in a lower non-display area of the upper surface of the TFT substrate. The color filter substrate extends to the lower non-display area of the upper surface of the TFT substrate.

In another aspect of the present disclosure, a liquid crystal display (LCD) device comprises a liquid crystal display panel including a thin film transistor (TFT) substrate and a color filter substrate on an upper surface of the TFT substrate, and a display area and a non-display area being defined at the liquid crystal display panel; a driver integrated circuit (IC) disposed at the non-display area of the upper surface of the TFT substrate; a flexible printed circuit board (FPCB) at the non-display area of the TFT substrate; and a pad area connecting the driver IC and the FPCB, wherein the color filter substrate extends to cover the pad area.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
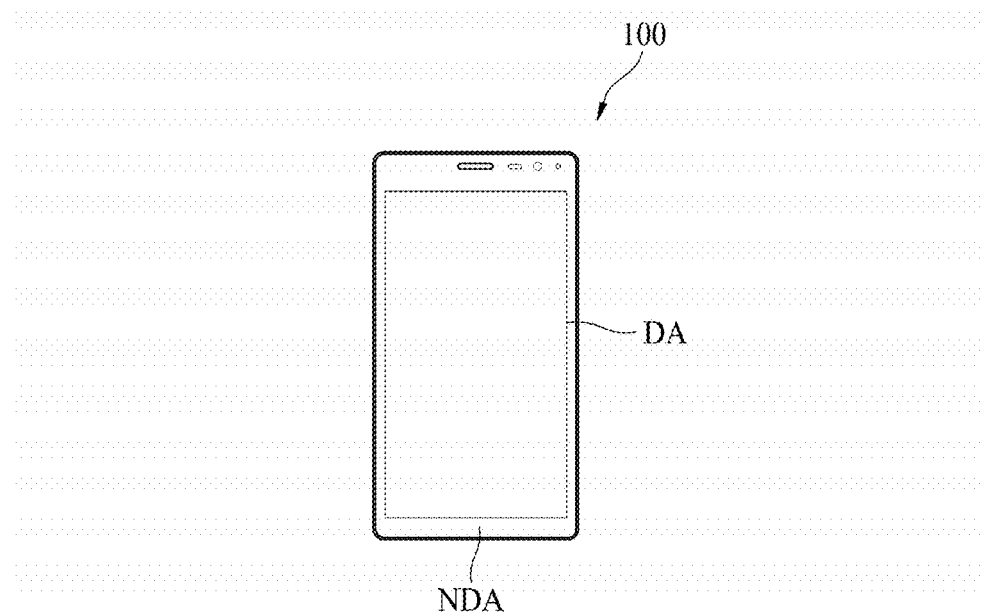
FIG. 1 is a perspective view illustrating an example of an LCD device according to an aspect of the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

A first horizontal axis direction, a second horizontal axis direction, and a vertical axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, exemplary aspects of the present disclosure will be described in detail with reference to the accompanying drawings. In the accompanying drawings, an X axis denotes a direction from the left to the right of an LCD device, a Y axis denotes a direction from a lower portion to an upper portion of the LCD device, and a Z axis denotes a direction (i.e., a thickness direction) from a rear surface to a front surface of the LCD device.

FIG. 1 is a perspective view illustrating an example of an LCD device 100 according to an aspect of the present disclosure.

Since LCD devices are driven with a low operating voltage, they have low power consumption and can be used as portable devices. Accordingly, the LCD devices are widely applied to various fields such as notebook computers, monitors, spacecraft, airplanes, etc.

Here, in mobile terminals which include the LCD device 100 and are widely used, a display area DA is provided in a front center portion of a liquid crystal display panel, and a non-display area NDA are provided to surround the display area DA. In the mobile terminals, the non-display area NDA is widely provided along a vertical direction of the display area DA rather than a lateral direction. A speaker for listening to sound, a camera, a flash, and/or the like are built into an upper portion of the non-display area NDA. A driver IC for driving a mobile terminal and a flexible printed circuit board (FPCB) connected to the outside is provided at a lower portion of the non-display area NDA.

Figure 2:
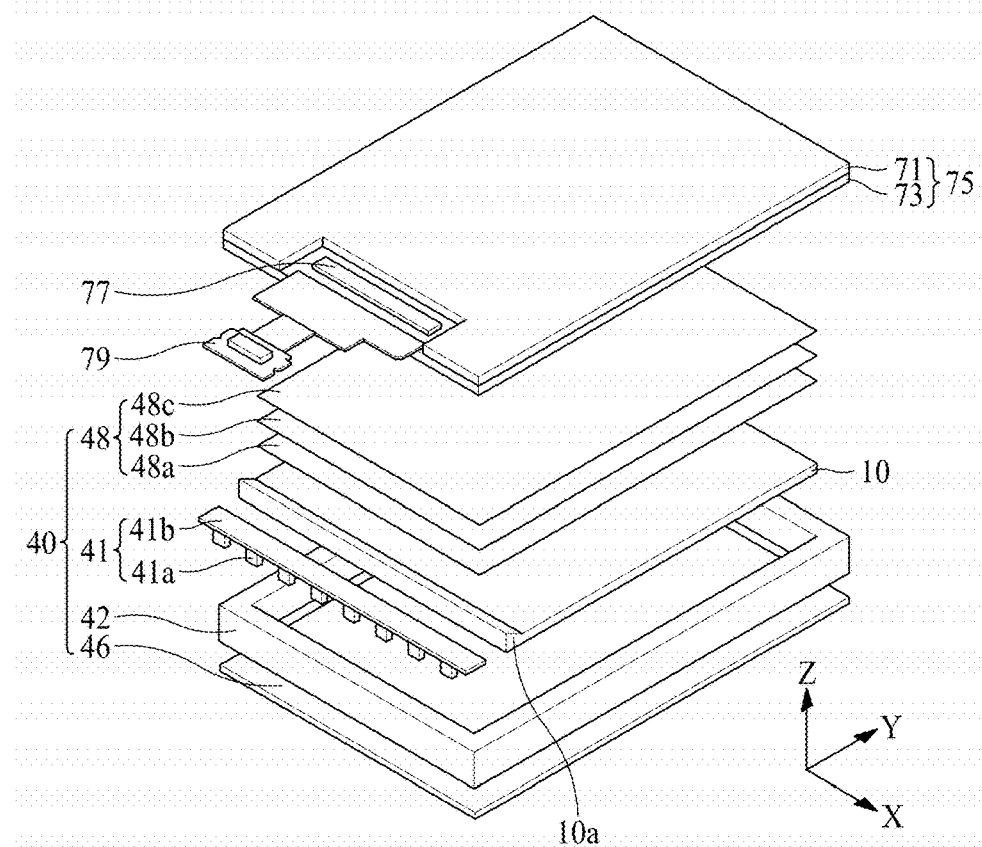
FIG. 2 is a schematic exploded perspective view of the LCD device according to an aspect of the present disclosure.
Figure 3:
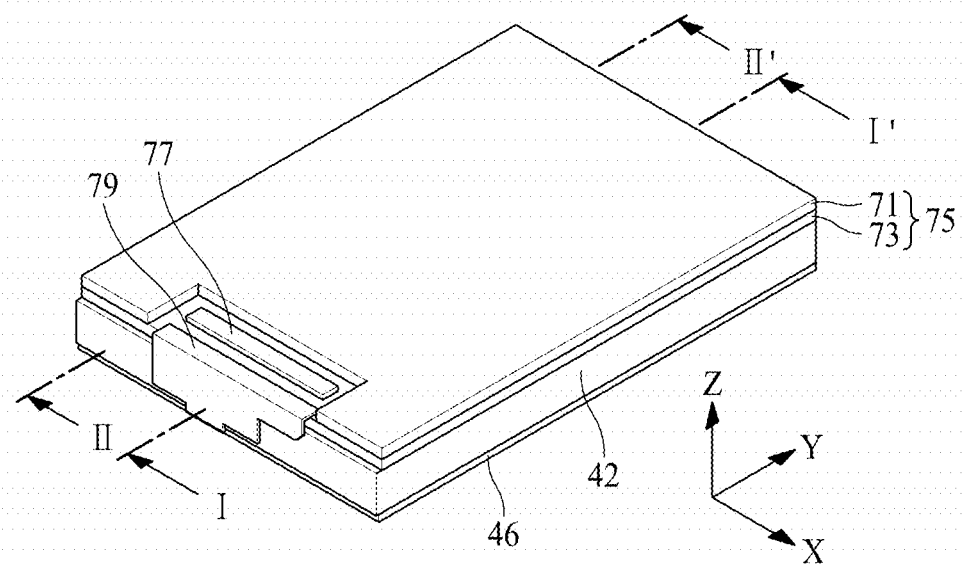
FIG. 3 is a schematic perspective view of the LCD device according to the first aspect of the present disclosure.

FIG. 2 is a schematic exploded perspective view of the LCD device according to an aspect of the present disclosure. FIG. 3 is a schematic perspective view of the LCD device according to an aspect of the present disclosure.

The LCD device according to an aspect of the present disclosure may include a backlight unit 40, a liquid crystal display panel 75, and a guide panel 42 supporting the backlight unit 40 and the liquid crystal display panel 75.

The backlight unit 40 may guide light to supply the light to the liquid crystal display panel 75.

The liquid crystal display panel 75 may selectively transmit the light supplied from the backlight unit 40 to display an image. A driver integrated circuit (IC) 77 and a flexible printed circuit board (FPCB) 79 may be installed on one side of the liquid crystal display panel 75.

The liquid crystal display panel 75 may include a thin film transistor (TFT) substrate 73 on which a plurality of TFTs are provided, a color filter substrate 71 disposed on and boned to the TFT substrate 73, and a liquid crystal injected between the color filter substrate 71 and the TFT substrate 73. The color filter substrate 71 and the TFT substrate 73 may be twistedly disposed, and thus, a portion of the TFT substrate 73 may be exposed. The driver IC 77 may be mounted on an edge of the exposed portion of the TFT substrate 73 to control the liquid crystal display panel 75.

The TFT substrate 73 may be a transparent glass substrate on which the TFTs are arranged in a matrix type, and may include a source terminal connected to a data line and a gate terminal connected to a gate line. The data line and the gate line may be connected to the driver IC 77.

The FPCB 79 may be connected to one side of the driver IC 77. When an electrical signal is applied from the FPCB 79, the electrical signal may be applied to a plurality of data lines and a plurality of gate lines through the driver IC 77, and thus, a TFT provided in each of a plurality of pixels may be turned on or off to apply or cut off a driving voltage to a corresponding pixel.

The color filter substrate 71 may be disposed on and bonded to the TFT substrate 73. The color filter substrate 71 may be a substrate where red (R), green (G), and blue (B) pixels (RGB pixels), which are color pixels realizing colors with light passing through the color pixels, are provided through a thin film process. A polarizer may be attached on a surface of each of the color filter substrate 71 and the TFT substrate 73 to polarize the light.

The backlight unit 40 may be provided on a side surface of the liquid crystal display panel 75 and may be surrounded by and fixed to the guide panel 42 so as to supply uniform light to the liquid crystal display panel 75. The backlight unit 40 may include a light source 41 which supplies light to the liquid crystal display panel 75, a light guide plate 10 which guides light emitted from the light source 41 to supply the light to the liquid crystal display panel 75, a reflective sheet 46 which is disposed on the whole lower surface of the light guide plate 10 to reflect the light, and an optical sheet 48 which converts the light, supplied from the light source (for example, a light emitting diode) 41, into uniform flat light to supply the uniform flat light to the liquid crystal display panel 75.

The light source 41 may be disposed as an edge type to face a light incident surface 10a of the light guide plate 10. The light source 41 may include a light emitting diode 41a and a flexible board 41b with the light emitting diode 41a mounted thereon. The flexible board 41b is good in bending. A circuit may be built into the flexible board 41b to turn on or off the light emitting diode 41a. The light source 41 may be disposed as a side view type, and the light emitting diode 41a may be disposed under the flexible board 41b to face the light incident surface 10a of the light guide plate 10. The light emitting diode 41a may be disposed to face the light incident surface 10a of the light guide plate 10, and the flexible board 41b may be disposed thereon and folded or unfolded.

The light guide plate 10 may be disposed in order for the light incident surface 10a to face the light source 41. The light guide plate 10 may be supplied with the light, emitted from the light source 41, through the light incident surface 10a. The light incident through the light incident surface 10a may be travel inside the light guide plate 10 and then may be transferred to an upper portion through a pattern provided on the upper portion. The light transferred to the upper portion may be supplied to the liquid crystal display panel 75 through the optical sheet 48 disposed on the light guide plate 10.

The light guide plate 10 may include the light incident surface 10a which receives the light from the light emitting diode 41a, a light output surface which faces the liquid crystal display panel 75 and transfers the light, and an inclined surface which connects the light incident surface 10a to the light output surface. The inclined surface may have a height which is progressively lowered in a direction from the light incident surface 10a to the light output surface, and a height of the light output surface may be constant. The optical sheet 48 may be disposed on the light output surface at the same height as the lowered height of the light guide plate 10. Therefore, a thickness of the LCD device may be reduced to decrease weight, and moreover, the LCD device may be slimly modularized. The light guide plate 10 may be high in stiffness, and thus, is not easily modified or broken. The light guide plate 10 may be formed of polymethyl methacrylate (PMMA) which has a good transmittance property.

The reflective sheet 46 may be disposed under the light guide plate 10. The reflective sheet 46 may reflect light, traveling under the light guide plate 10, to the light output surface of the light guide plate 10 to enhance light efficiency and may control a total reflection amount of incident light in order for the light output surface to wholly have a uniform luminance distribution.

The optical sheet 48 may be disposed on the light output surface of the light guide plate 10. The optical sheet 48 may diffuse and condense the light incident from the light guide plate 10 and may include a diffusive sheet 48a, a prism sheet 48b, and a protective sheet 48c. The diffusive sheet 48a may include a base plate and a bead-shaped coating layer provided on the base plate. The diffusive sheet 48a may diffuse the light irradiated from the light source 41 to supply the diffused light to the liquid crystal display panel 75. The prism sheet 48b may include prisms which have a triangular pillar shape and are arranged on an upper surface of the prism sheet 48b. The light diffused by the diffusive sheet 48a may be condensed in a direction vertical to a plane of the liquid crystal display panel 75. The protective sheet 48c may protect the prism sheet 48b vulnerable to a scratch.

The guide panel 42 may surround and fix a border of each of the light guide plate 10 and the optical sheet 48, and moreover, may support the liquid crystal display panel 75 disposed thereon. The guide panel 42 may be formed of a metal material or a plastic material such as polycarbonate (PC) or the like.

Figure 4:
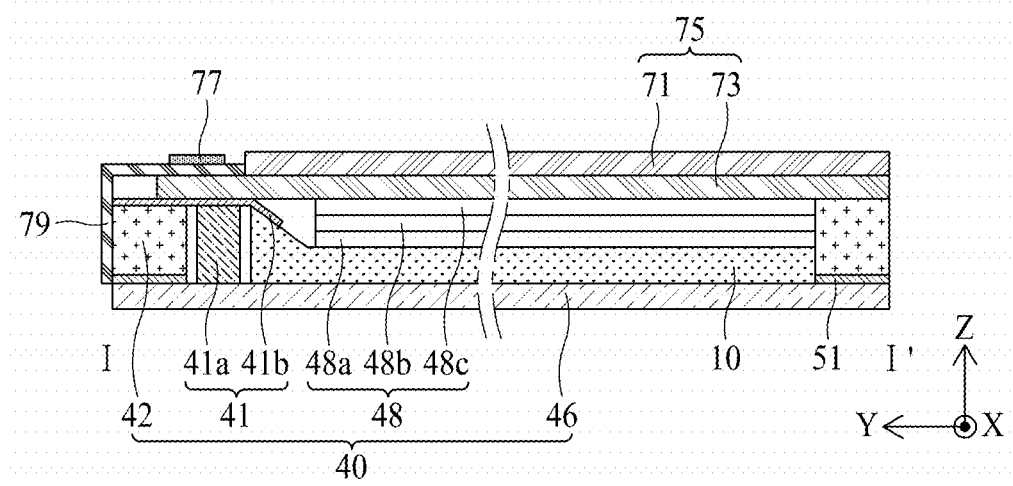
FIG. 4 is a schematic cross-sectional view taken along line I-I' in the LCD device according to an aspect of the present disclosure.
Figure 5:
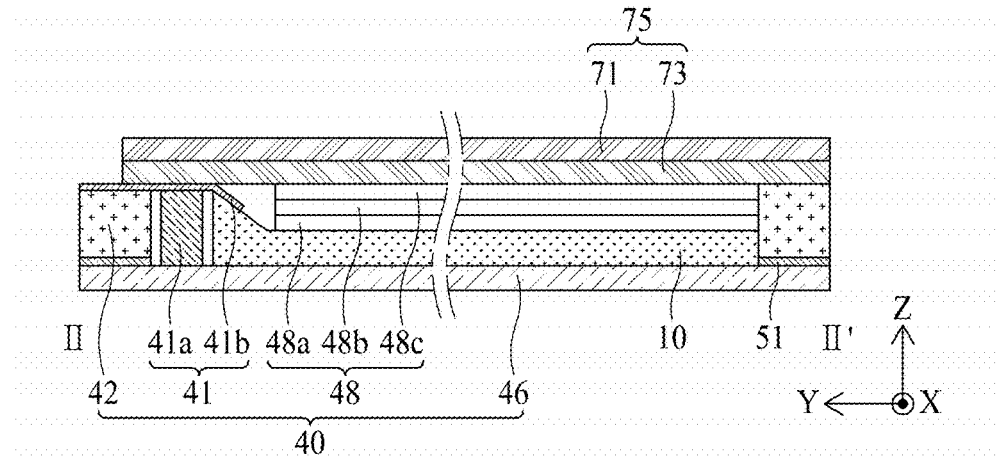
FIG. 5 is a schematic cross-sectional view taken along line II-II' in the LCD device according to an aspect of the present disclosure.

FIG. 4 is a schematic cross-sectional view taken along line I-I' in the LCD device according to an aspect of the present disclosure. FIG. 5 is a schematic cross-sectional view taken along line II-II' in the LCD device according to an aspect of the present disclosure.

The color filter substrate 71 according to an aspect of the present disclosure may extend to a non-display area of an upper surface of the TFT substrate 73. The color filter substrate 71 may fundamentally be an upper substrate and may add a color to light transferred from the light guide plate 10 to the upper portion. Accordingly, even when the color filter substrate 71 is provided in only a display area, an image is normally displayed.

However, when the color filter substrate 71 is provided in only the display area, the display area may be thickened by a thickness of the color filter substrate 71, but since the color filter substrate 71 is not provided in the non-display area, the non-display area may be relatively thin in thickness. For this reason, a step height occurs between the display area and the non-display area.

In order to remove the step height, a separate border member may be provided in the non-display area, thereby removing the step height between the non-display area and the display area. In this case, however, an upper surface of the display area and an upper surface of the non-display area are not connected to have a single layer, and a gap can be formed therebetween. For this reason, a boundary of the display area and a boundary of the non-display area are separated from each other, or a crack therebetween can occur.

When the color filter substrate 71 extends to the non-display area of the upper surface of the TFT substrate 73 like the LCD device according to an aspect of the present disclosure, the upper surface of the display area and the upper surface of the non-display area may be connected to have a single layer (for example, the color filter substrate 71). When upper surfaces of the boundaries are connected to have one layer or one film, the boundaries are not easily separated from each other. This is because the color filter substrate 71 acts as a connection element or a bridge between the display area and the non-display area. Accordingly, in the LCD device according to an aspect of the present disclosure, the boundary of the display area and the boundary of the non-display area are not separated from each other, and moreover, a crack therebetween does not occur.

The color filter substrate 71 according to an aspect of the present disclosure may extend to a lower non-display area where the driver IC 77 is disposed. Since the driver IC is provided in the lower non-display area as described above, the lower non-display area may be wider than a non-display area in a lateral direction. Also, a plurality of pads for a plurality of electrical connections may be provided in a region, where the driver IC 77 is not disposed, of the lower non-display area so as to connect the driver IC 77 to the FPCB 79. The region may be defined as a pad part.

Particularly, a number of lines for electrical connections are provided in the pad part, and thus, when a crack occurs in the pad part, an error occurs in driving of the LCD device. Also, the pad part may be provided adjacent to the boundary of the display area and the boundary of the non-display area, and may be an area where a crack occurs frequently. Therefore, a crack occurrence must be prevented in the pad part.

The color filter substrate 71 according to an aspect of the present disclosure may extend to the lower non-display area where the driver IC 77 is disposed, and may cover the pad part where the pads are provided. Accordingly, in an aspect of the present disclosure, an effective structure for preventing a crack from occurring in the non-display area where the pad part is provided is realized.

Particularly, in an aspect of the present disclosure, the color filter substrate 71 may extend to both side areas of the driver IC 77, in the lower portion of the non-display area where the driver IC 77 is disposed.

The color filter substrate 71 may extend to both side surfaces of the driver IC 77 and may extend to a portion where the TFT substrate 73 is provided. That is, a border of the color filter substrate 71 may match a border of the TFT substrate 73 in the both side areas of the driver IC 77.

When an external impact is applied to the LCD device according to an aspect of the present disclosure, an impact applied to a non-display area of a corner is greater than an impact applied to a non-display area of a center portion. For this reason, a crack more frequently occurs on the corners of the LCD device.

In the LCD device according to an aspect of the present disclosure, the color filter substrate 71 may extend to both side corners of the driver IC 77 in order for the TFT substrate 73 to match a border of the color filter substrate 71. Accordingly, in the LCD device according to an aspect of the present disclosure, a crack is effectively prevented from occurring in an area adjacent to a lower corner in both side surfaces of the driver IC 77.

Moreover, the color filter substrate 71 of the LCD device according to an aspect of the present disclosure may not overlap the driver IC 77. Therefore, a center portion of the color filter substrate 71 may not cover the driver IC 77 and may be disposed in only an upper portion of an area where the driver IC 77 is provided.

The driver IC 77 itself may have a certain thickness. Therefore, if the color filter substrate 71 covers the driver IC 77, the color filter substrate 71 may not be flatly covered by the driver IC 77, and a portion where the driver IC 77 is provided may convexly protrude. In this case, the color filter substrate 71 can be separated from the TFT substrate 73.

For example, in a plan view of the color filter substrate 71, a center portion may be shorter in length than a side portion. Therefore, the color filter substrate 71 does not reach the driver IC 77. In this case, a crack prevention effect where a crack is prevented from occurring in a side portion of the color filter substrate 71 is obtained, and the color filter substrate 71 may not overlap the driver IC 77 and thus may be raised, thereby preventing the color filter substrate 71 from being separated from the TFT substrate 73.

Figure 6:
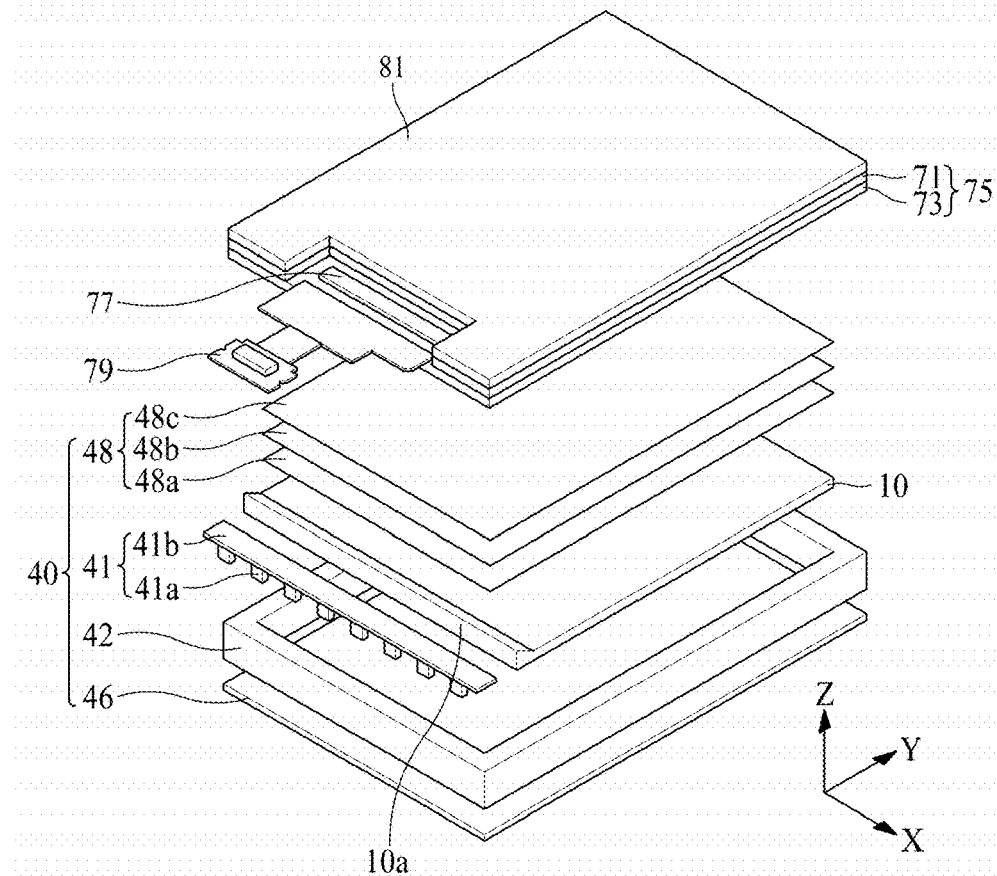
FIG. 6 is a schematic exploded perspective view of an LCD device according to another aspect of the present disclosure.
Figure 7:
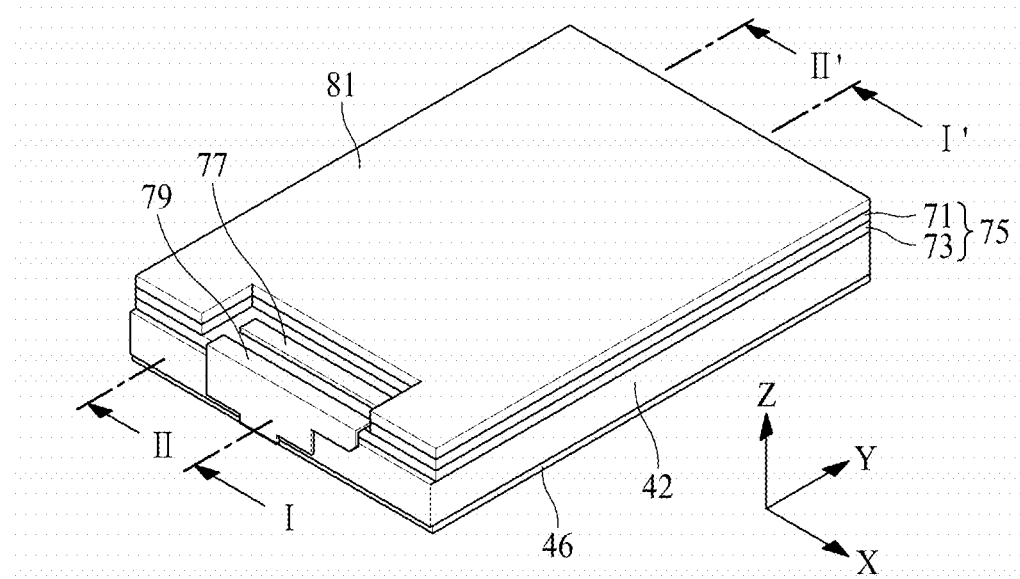
FIG. 7 is a schematic perspective view of the LCD device according to another aspect of the present disclosure.

FIG. 6 is a schematic exploded perspective view of an LCD device according to another aspect of the present disclosure. FIG. 7 is a schematic perspective view of the LCD device according to another aspect of the present disclosure.

The LCD device according to another aspect of the present disclosure may include a backlight unit 40, a liquid crystal display panel 75, and a guide panel 42 supporting the backlight unit 40 and the liquid crystal display panel 75. The backlight unit 40 and the guide panel 42 according to another aspect of the present disclosure may have the same configuration and function as those of the backlight unit 40 and the guide panel 42 according to the previously disclosed aspect of the present disclosure as shown in FIG. 2. Hereinafter, descriptions of the backlight unit 40 and the guide panel 42 are omitted.

The liquid crystal display panel 75 may selectively transmit light supplied from the backlight unit 40 to display an image. A driver IC 77 and an FPCB 79 may be installed on one side of the liquid crystal display panel 75.

The liquid crystal display panel 75 may include a TFT substrate 73 on which a plurality of TFTs are provided, a color filter substrate 71 disposed on and boned to the TFT substrate 73, a liquid crystal injected between the color filter substrate 71 and the TFT substrate 73, and an upper polarization film 81 disposed on the color filter substrate 71. The color filter substrate 71 and the TFT substrate 73 may be twistedly disposed, and thus, a portion of the TFT substrate 73 may be exposed. The driver IC 77 may be mounted on an edge of the exposed portion of the TFT substrate 73 to control the liquid crystal display panel 75.

The TFT substrate 73 may be a transparent glass substrate on which the TFTs are arranged in a matrix type, and may include a source terminal connected to a data line and a gate terminal connected to a gate line. The data line and the gate line may be connected to the driver IC 77.

The FPCB 79 may be connected to one side of the driver IC 77. When an electrical signal is applied from the FPCB 79, the electrical signal may be applied to a plurality of data lines and a plurality of gate lines through the driver IC 77, and thus, a TFT provided in each of a plurality of pixels may be turned on or off to apply or cut off a driving voltage to a corresponding pixel.

The color filter substrate 71 may be disposed on and bonded to the TFT substrate 73. The color filter substrate 71 may be a substrate where RGB pixels, which are color pixels realizing colors with light passing through the color pixels, are provided through a thin film process.

The upper polarization film 81 may be disposed on the color filter substrate 71. The upper polarization film 81 may be attached on a surface of the color filter substrate 71. The upper polarization film 81 may polarize light passing through the color filter substrate 71 and the TFT substrate 73.

Figure 8:
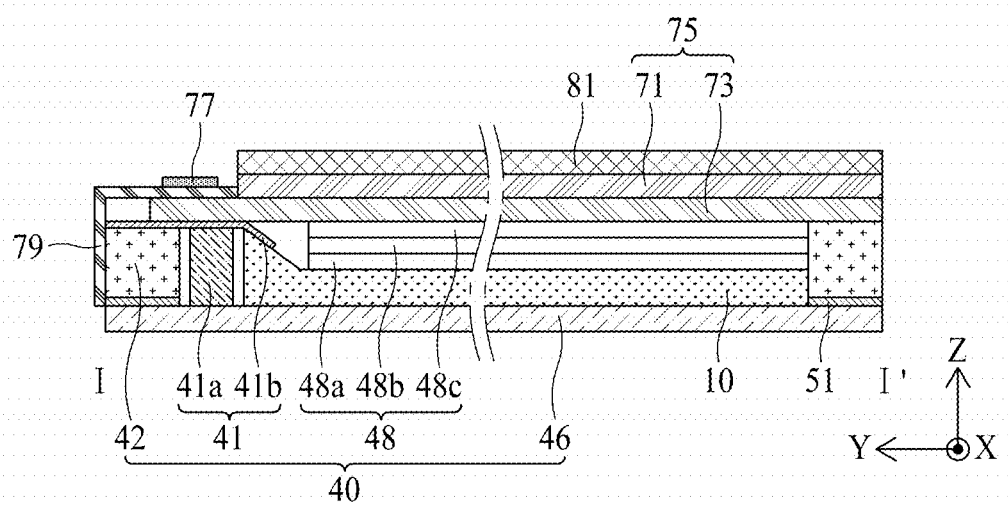
FIG. 8 is a schematic cross-sectional view taken along line I-I' in the LCD device according to another aspect of the present disclosure.
Figure 9:
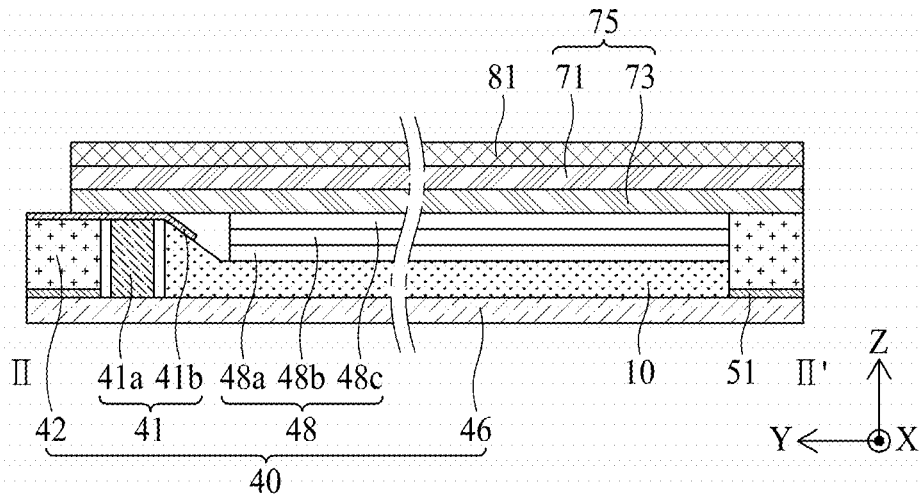
FIG. 9 is a schematic cross-sectional view taken along line II-II' in the LCD device according to another aspect of the present disclosure.

FIG. 8 is a schematic cross-sectional view taken along line I-I' in the LCD device according to another aspect of the present disclosure. FIG. 9 is a schematic cross-sectional view taken along line II-II' in the LCD device according to another aspect of the present disclosure.

The upper polarization film 81 according to the present disclosure may extend to a non-display area of an upper surface of the TFT substrate 73. The upper polarization film 81 may fundamentally be attached on the color filter substrate 71 to polarize light transferred from the light guide plate 10 to an upper portion. Accordingly, even when the upper polarization film 81 is provided in only a display area, an image is normally displayed.

However, when the upper polarization film 81 is provided in only the display area, the display area may be thick by adding a thickness of the upper polarization film 81, but since the upper polarization film 81 is not provided in a non-display area, the non-display area may be relatively thin in thickness. For this reason, a step height occurs between the display area and the non-display area.

In order to remove the step height, a separate border member may be provided in the non-display area, thereby removing the step height between the non-display area and the display area. In this case, however, an upper surface of the display area and an upper surface of the non-display area are not connected to have a single layer, and a gap is formed therebetween. For this reason, a boundary of the display area and a boundary of the non-display area are separated from each other, or a crack therebetween occurs.

When the upper polarization film 81 extends to the non-display area of the upper surface of the TFT substrate 73 like the LCD device according to another aspect of the present disclosure, the upper surface of the display area and the upper surface of the non-display area may be connected to have a single layer (for example, the upper polarization film 81). When upper surfaces of the boundaries are connected to have one layer or one film, the boundaries are not easily separated from each other. This is because the upper polarization film 81 acts as a connection element or a bridge between the display area and the non-display area. Accordingly, in the LCD device according to another aspect of the present disclosure, the boundary of the display area and the boundary of the non-display area are not separated from each other, and moreover, a crack therebetween does not occur.

The upper polarization film 81 according to another aspect of the present disclosure may extend to a lower non-display area where the driver IC 77 is disposed. Since the driver IC 77 is provided in the lower non-display area as described above, the lower non-display area may be wider than a non-display area in a lateral direction. Also, a plurality of pads for a plurality of electrical connections may be provided in a region, where the driver IC 77 is not disposed, of the lower non-display area so as to connect the driver IC 77 to the FPCB 79. The region may be defined as a pad part.

Particularly, a number of lines for electrical connections are provided in the pad part, and thus, when a crack occurs in the pad part, an error occurs in driving of the LCD device. Also, the pad part may be provided adjacent to the boundary of the display area and the boundary of the non-display area, and may be an area where a crack occurs frequently. Therefore, it is important for a crack not to occur in the pad part.

The upper polarization film 81 according to another aspect of the present disclosure may extend to the lower non-display area where the driver IC 77 is disposed, and may cover the pad part where the pads are provided. Accordingly, in another aspect of the present disclosure, an effective structure for preventing a crack from occurring in the non-display area where the pad part is provided is realized.

Particularly, in another aspect of the present disclosure, the upper polarization film 81 may extend to both side areas of the driver IC 77, in the lower non-display area where the driver IC 77 is disposed.

The upper polarization film 81 may extend to both side surfaces of the driver IC 77 and may extend to a portion where the TFT substrate 73 is provided. That is, a border of the upper polarization film 81 may match a border of the TFT substrate 73 in the both side areas of the driver IC 77.

When an external impact is applied to the LCD device according to another aspect of the present disclosure, an impact applied to a non-display area of a corner is greater than an impact applied to a non-display area of a center portion. For this reason, a crack more frequently occurs on the corners of the LCD device.

In the LCD device according to another aspect of the present disclosure, the upper polarization film 81 may extend to both side corners of the driver IC 77 in order for the TFT substrate 73 to match a border of the upper polarization film 81. Accordingly, in the LCD device according to another aspect of the present disclosure, a crack is effectively prevented from occurring in an area adjacent to a lower corner in both side surfaces of the driver IC 77.

Moreover, the upper polarization film 81 of the LCD device according to the second aspect of the present disclosure may not overlap the driver IC 77. Therefore, a center portion of the upper polarization film 81 may not cover the driver IC 77 and may be disposed in only an upper portion of an area where the driver IC 77 is provided.

The driver IC 77 itself may have a certain thickness. Therefore, if the upper polarization film 81 covers the driver IC 77, the upper polarization film 81 is not flatly covered by the driver IC 77, and a portion where the driver IC 77 is provided may convexly protrude. In this case, the upper polarization film 81 can be separated from the TFT substrate 73.

For example, in a plan view of the upper polarization film 81, a center portion may be shorter in length than a side portion. Therefore, the upper polarization film 81 does not reach the driver IC 77. In this case, a crack prevention effect where a crack is prevented from occurring in a side portion of the upper polarization film 81 is obtained, and the upper polarization film 81 may not overlap the driver IC 77 and thus may be raised, thereby preventing the upper polarization film 81 from being separated from the TFT substrate 73.

Figure 10:
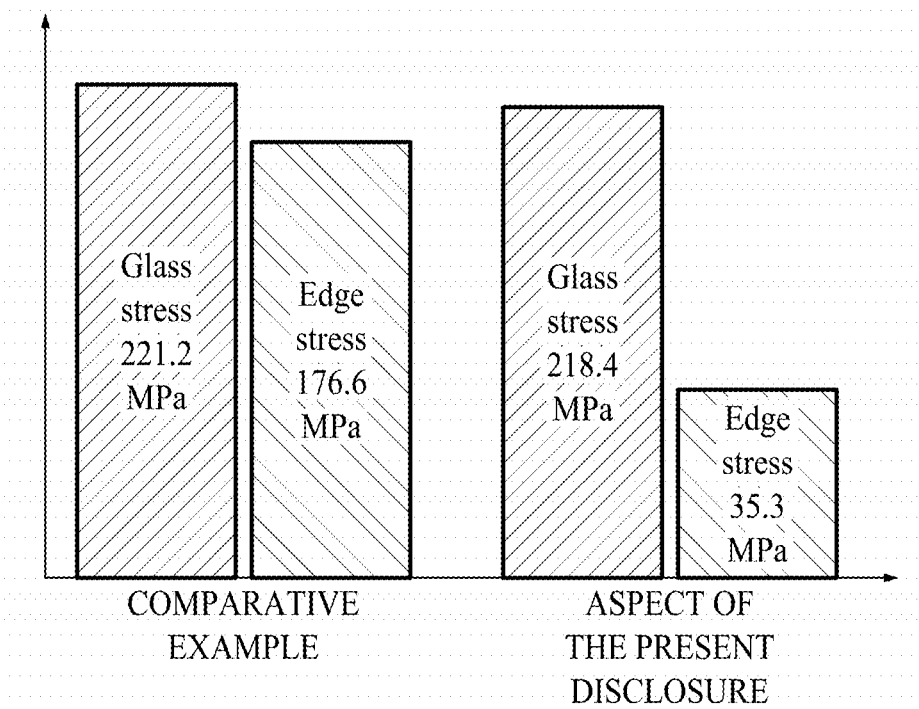
FIG. 10 is a graph showing a result obtained by comparing results of stiffness simulation experiments respectively performed on an LCD device according to a comparative example and an LCD device according to an aspect of the present disclosure.
Figure 11:
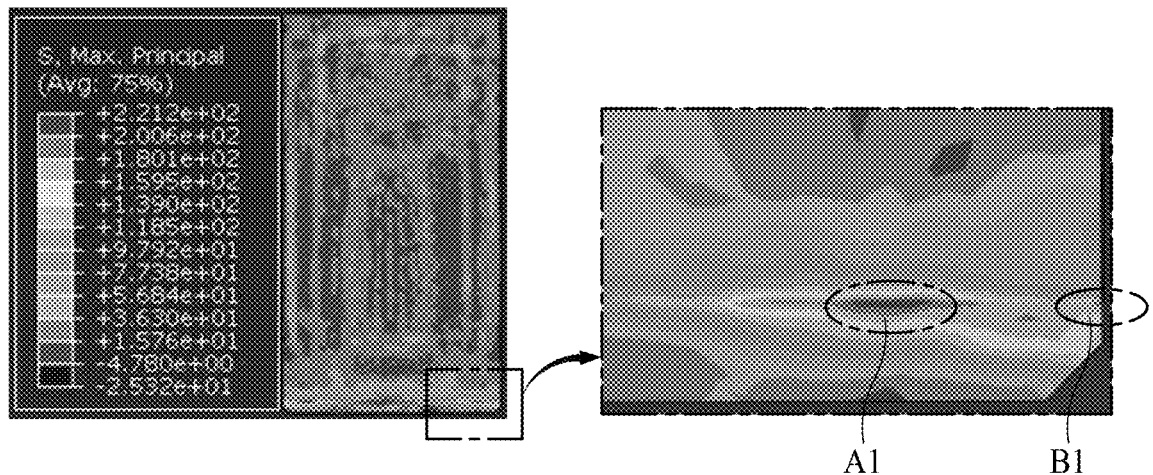
FIG. 11 shows a result of a stiffness simulation experiment performed on an LCD device according to the comparative example.
Figure 12:
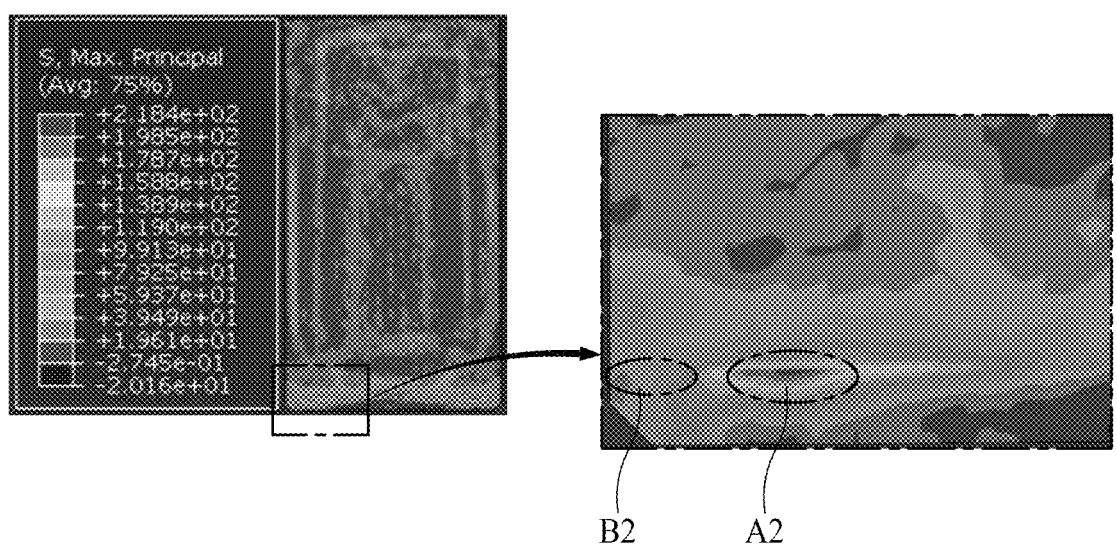
FIG. 12 shows a result of a stiffness simulation experiment performed on an LCD device according to an aspect of the present disclosure.

FIG. 10 is a graph showing a result obtained by comparing results of stiffness simulation experiments respectively performed on an LCD device according to the comparative example and an LCD device according to the present disclosure. FIG. 11 shows a result of a stiffness simulation experiment performed on an LCD device according to the comparative example. FIG. 12 shows a result of a stiffness simulation experiment performed on an LCD device according to the present disclosure. In FIGS. 10 to 12, it is assumed that an LCD device generally used in the related art is the comparative example, and the LCD device according to the present disclosure is compared with the comparative example.

The TFT substrate 73 according to the present disclosure is generally formed of a transparent glass, and thus, in FIGS. 10 to 12, glass denotes the TFT substrate 73. Also, in the LCD device according to the present disclosure, a region, including the pad part, of the boundary of each of the display area and the non-display area is a region where the most cracks occur, and thus, in FIGS. 10 to 12, an edge denotes a pad part.

As a simulation result, in the comparative example, a stress applied to the glass is 221.2 MPa, and a stress applied to the edge is 176.6 MPa. On the other hand, in the aspect, a stress applied to the glass is 218.4 MPa, and a stress applied to the edge is 35.3 MPa.

That is, in comparison with the comparative example, the stress applied to the glass is about 98.7%, and the stress applied to the edge is about 20%. That is, it can be seen that the stress itself applied to the glass is not reduced, but due to the color filter substrate 71 or the upper polarization film 81 provided up to the edge, a considerable stress is distributed from the edge to a whole area. Accordingly, the stress is prevented from being intensively applied to the edge.

Based on a precise simulation result for each area, in the comparative example, a level of a stress applied to a first glass area A1 has no difference with a level of a stress applied to a first edge area B1. That is, the stress applied to the first glass area A1 is transferred to the first edge area B1 as-is, and a crack occurs in the first edge area B1.

On the other hand, in the present disclosure, a stress applied to a second edge area B2 is greatly reduced in comparison with a level of a stress applied to a second glass area A2. That is, a stress applied to a second glass area A2 is transferred to a second edge area B2 and is distributed by the color filter substrate 71 or the upper polarization film 81 disposed on the TFT substrate 73 to decrease a level of a stress applied to the second edge area B2.

As a result, in the LCD device of the present disclosure, stiffness is enhanced by extending a layer, provided in the display area, to a portion of the TFT substrate where the pad part is provided, and by using a structure for decreasing an impact applied to the pad part of the TFT substrate, a crack is prevented from occurring.

In the LCD device of the present disclosure, since a layer provided in the display area extends to a portion of the TFT substrate where the pad part is disposed, stiffness is enhanced, and by using a structure for decreasing an impact applied to the pad part of the TFT substrate, a crack is prevented from occurring.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A liquid crystal display (LCD) device comprising:
   a liquid crystal display panel including a thin film transistor (TFT) substrate and a color filter substrate on an upper surface of the TFT substrate, and a display area and a non-display area being defined at the liquid crystal display panel;
   a guide panel supporting the liquid crystal display panel;
   a driver integrated circuit (IC) disposed at the non-display area of the upper surface of the TFT substrate and driving the liquid crystal display panel;
   wherein the color filter substrate has first and second extended portions and a recessed portion between the first and second extended portions, and
   wherein the driver IC is disposed within the recessed portion that has a shape matching a contour of the driver IC, and the first and second extended portions extend beyond the driver IC and to the display area at the non-display area of the upper surface of the TFT substrate to match an outermost edge of the TFT substrate;
   an upper polarization film disposed on the color filter substrate,
   wherein the upper polarization film has first and second extended parts and a recessed part between the first and second extended parts,
   wherein the first and second extended parts of the upper polarization film are disposed to correspond to the first and second extended portions of the color filter substrate, and
   wherein the driver IC is disposed within the recessed portion of the upper polarization film that has a same shape as the color filter substrate;
   a flexible printed circuit board disposed within the recessed portion and connected to the driver IC; and
   a light source including a light emitting diode and a flexible board having the light emitting diode mounted thereon,
   wherein the flexible board is disposed between the liquid crystal display panel and a light guide plate, and one end portion of the flexible board is folded along a sloped surface of the light guide plate.

2. The LCD device of claim 1, wherein the color filter substrate has a space at the recessed portion accommodating the driver IC.

3. The LCD device of claim 2, wherein the color filter substrate extends to both side areas of the driver IC.

4. The LCD device of claim 2, wherein the color filter substrate and the TFT substrate have a shape matching each other at the both side areas of the driver IC.

5. The LCD device of claim 2, wherein the color filter substrate does not overlap the driver IC.

6. The LCD device of claim 1, wherein the shape of the upper polarization film matches a shape of the color filter substrate.

7. The LCD device of claim 6, wherein the upper polarization film extends to the non-display area in a direction where the driver IC is disposed.

8. The LCD device of claim 7, wherein the upper polarization film extends to both side areas of the driver IC.

9. The LCD device of claim 8, wherein the upper polarization film and the color filter substrate have a shape matching each other at the both side areas of the driver IC.

10. The LCD device of claim 7, wherein the upper polarization film does not overlap the driver IC.

11. A liquid crystal display (LCD) device comprising:
- a liquid crystal display panel including a thin film transistor (TFT) substrate and a color filter substrate on an upper surface of the TFT substrate, and a display area and a non-display area being defined at the liquid crystal display panel;
- a driver integrated circuit (IC) disposed at the non-display area of the upper surface of the TFT substrate and driving the liquid crystal display panel;
- a flexible printed circuit board (FPCB) at the non-display area of the TFT substrate; and
- a pad area connecting the driver IC and the FPCB, wherein the color filter substrate extends to cover the pad area,
- wherein the color filter substrate has first and second extended portions and a recessed portion between the first and second extended portions, and
- wherein the driver IC is disposed within the recessed portion that has a shape matching a contour of the driver IC, and the first and second extended portions extend beyond the driver IC and to the display area at the non-display area of the upper surface of the TFT substrate to match an outermost edge of the TFT substrate, and
- an upper polarization film disposed on the color filter substrate,
- wherein the upper polarization film has first and second extended parts and a recessed part between the first and second extended parts,
- wherein the first and second extended parts of the upper polarization film are disposed to correspond to the first and second extended portions of the color filter substrate, and
- wherein the driver IC is disposed within the recessed portion of the upper polarization film that has a same shape as the color filter substrate;
- a flexible printed circuit board disposed within the recessed portion and connected to the driver IC; and
- a light source including a light emitting diode and a flexible board having the light emitting diode mounted thereon,
- wherein the flexible board is disposed between the liquid crystal display panel and a light guide plate, and one end portion of the flexible board is folded along a sloped surface of the light guide plate.

12. The LCD device of claim 11, wherein the color filter substrate has a space at the recessed portion accommodating the driver IC.

13. The LCD device of claim 11, wherein the color filter substrate extends to both side areas of the driver IC.

14. The LCD device of claim 13, wherein the color filter substrate and the TFT substrate have a shape matching each other at the both side areas of the driver IC.

15. The LCD device of claim 11, wherein the color filter substrate does not vertically overlap the driver IC.

16. The LCD device of claim 11, wherein the upper polarization film matches a shape of the color filter substrate.

17. The LCD device of claim 16, wherein the upper polarization film extends to the non-display area in a direction where the driver IC is disposed.

18. The LCD device of claim 17, wherein the upper polarization film extends to both side areas of the driver IC.

19. The LCD device of claim 18, wherein the polarization film and the upper color filter substrate have a shape matching each other at the both side areas of the driver IC.

20. The LCD device of claim 17, wherein the upper polarization film does not vertically overlap the driver IC.

* * * * *